United States Patent [19]
Wykoff

[11] Patent Number: 4,867,219
[45] Date of Patent: Sep. 19, 1989

[54] PNEUMATIC TIRE AND TIRE CARCASS HAVING "DIRECTIONAL" OR "ROTARY STRENGTH IMBALANCED" HIGH RIGIDITY CONFLUENT BELT PLY ASSEMBLIES AND "DIRECTIONAL TIRE OPERATIOAL CHARACTERISTICS"

[76] Inventor: Clyde R. Wykoff, 1929 Ganyard Rd., Akron, Ohio 44313

[21] Appl. No.: 23,954

[22] Filed: Mar. 16, 1987

Related U.S. Application Data

[63] Continuation of Ser. No. 670,936, Nov. 13, 1984, abandoned, which is a continuation-in-part of Ser. No. 559,426, Dec. 8, 1983, abandoned.

[51] Int. Cl.⁴ .................................................. B60C 9/18
[52] U.S. Cl. ...................................... 152/536; 152/538
[58] Field of Search ............... 152/455, 527, 528, 529, 152/533, 532, 531, 534–538

[56] References Cited

U.S. PATENT DOCUMENTS

| | | | |
|---|---|---|---|
| 2,984,282 | 5/1961 | Vittorelli | 152/361 R |
| 3,550,666 | 12/1970 | Menell | 152/361 R |
| 3,612,136 | 10/1971 | Gough | 152/361 R |
| 3,881,492 | 5/1975 | Mirtain | 152/361 R |
| 4,176,703 | 12/1979 | Nojima et al. | 152/361 R |
| 4,360,051 | 11/1982 | Wykoff | 152/361 R |

FOREIGN PATENT DOCUMENTS 1163817  9/1969  United Kingdom ............ 152/361 R Primary Examiner—Raymond Hoch
Attorney, Agent, or Firm—Oldham & Oldham Co.

[57] ABSTRACT

A directional type pneumatic tire, one that must be mounted on vehicle wheels to rotate in a specified direction of wheel rotation, having circumferential or rotary imbalanced belt ply cord strength and rigidity and directionally strengthened resistance to torsional stress forces in forward operational mode, which tire has a tire crown area and a cord carcass; the tire tread having two tread shoulder areas, and wherein the tire cord carcass belt ply assembly includes at least one two-piece confluent ply of relatively narrow belt ply cord material including cords positioned at high rigidity bias angles and each two-piece confluent ply being inclined in one rotary direction; the cord angles of said narrow confluent belt ply pieces inclined at commercially equal but opposite bias angles from an area under one tread shoulder across the carcass crown extending significantly beyond the circumferential centerline of the tire carcass and terminating significantly short of the area under the other tread shoulder. The tire belt ply assembly also may include conventional or standard belt ply pieces and known reinforcing cord material.

8 Claims, 2 Drawing Sheets

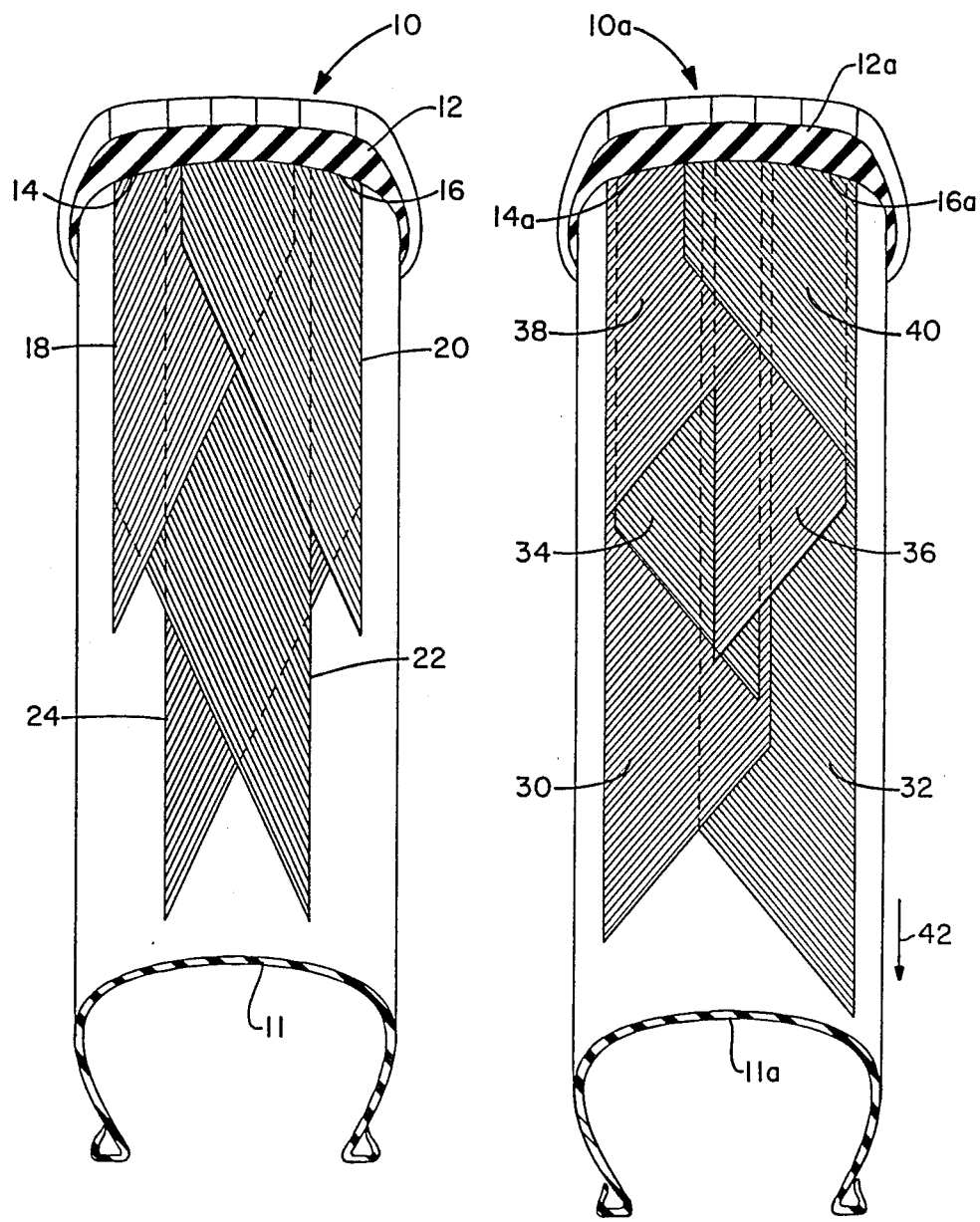

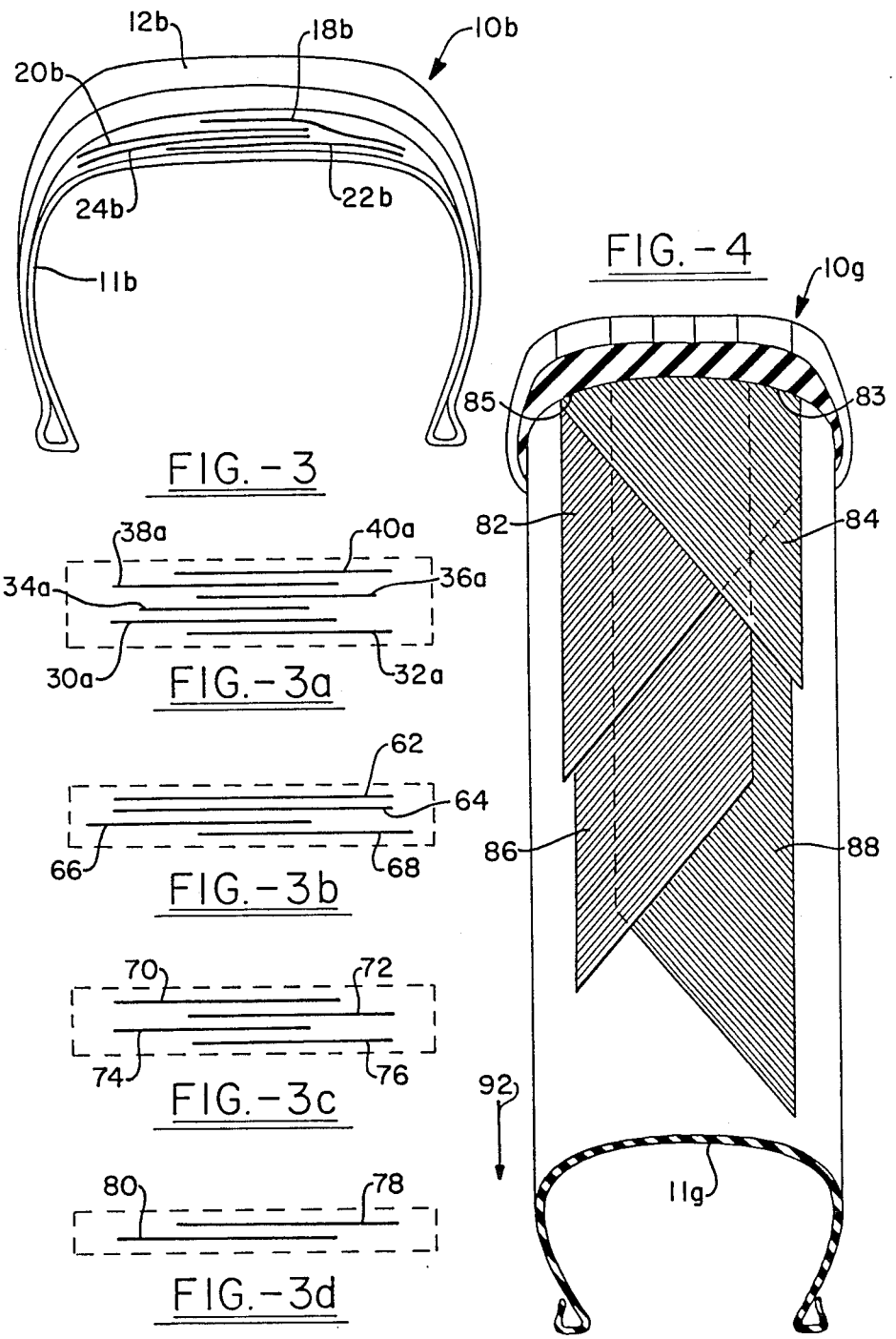

PNEUMATIC TIRE AND TIRE CARCASS HAVING "DIRECTIONAL" OR "ROTARY STRENGTH IMBALANCED" HIGH RIGIDITY CONFLUENT BELT PLY ASSEMBLIES AND "DIRECTIONAL TIRE OPERATIOAL CHARACTERISTICS"

This is a continuation application of my prior Ser. No. 670,936 filed Nov. 13, 1984, now abandoned, which is a continuation-in-part application of my previous application bearing Ser. No. 559,426, filed Dec. 8, 1983, now abandoned.

TECHNICAL FIELD

In the past two decades exceptional progress has been made in the quality and performance level of radial type passenger tires. Most of this improvement is the consequence of extensive research and development programs designed and implemented to improve the following major contributing factors; new synthetic textile and wire reinforcing cord materials, new hi-tech synthetic rubber polymers, new high adhesion synthetic-natural rubber compound combinations, special moisture control procedures for material handling and storage, intensified quality control programs to improve workmanship and manufacturing equipment, new low profile tire mold designs, new tread pattern designs, higher internal tire pressure specifications and consumer operational tire instructions that recommend *directional* tire usage of these *non-directional* belt and body ply cord reinforced tire constructions. However, two major problems persist and elude solution. One is very undesirable impact shocks against the vehicle's suspension system at city speeds over roadbed expansion joints and abrupt changes in highway road surfaces. The other is uneven and wasteful wear on the tire tread surface, i.e. the tread shoulder areas are worn smooth long before the mid-center area of the tread making it necessary to discard or retread the tire prematurely.

The circumferentially imbalanced cord reinforcement strength of the invented belt ply structures is designed to overcome the existing tire performance problems by:
 (a) Reducing tread squirm and/or physical hysteresis in the crown area of the tire.
 (b) Reducing tire temperature buildup that accelerates tread wear and/or causes premature tire separation failure.

Special features of "directionally strengthened and directionally rotating pneumatic tire carcasses" are disclosed and the invention particularly relates to cord tire carcass constructions comprised of new "Belt Ply" design concepts for controlling an imbalance in the circumferential or rotary directional ply cord rigidity and strength of the tire crown area by the provision of a confluent belt ply or a plurality of confluent belt type plies in the tire carcass and wherein the belt ply pieces are positioned under opposite tread shoulder areas of the tire and at least one two-piece confluent ply must extend to and must overlap significantly more than a marginal distance beyond the tire mid-circumferential center line but never to the opposite tread shoulder area. The commercially equal cord bias angles of each ply piece of said confluent belt plies are positioned in opposite rotary or circumferential direction of the tire to form a confluent belt ply assembly. The cured tire may include known belt ply cord materials and be utilized as the belt ply assembly of confluent ply, radial ply or bias type tires. All tires comprising these circumferentially imbalanced belt ply cord assemblies must be mounted on vehicle wheels to rotate the directionally strengthened belt ply assembly in a specified direction of wheel rotation.

BACKGROUND ART

Reference is made to applicant's prior U.S. Pat. No. 4,360,051 that discloses and covers pneumatic and tire body ply carcass designs having both directional and non-directional construction and/or operating characteristics. Said prior patent also particularly refers to confluent *body plies* in pneumatic tire designs and wherein the term confluent plies is used to identify a tire *body ply* comprising two narrow *body ply* pieces of suitable cord fabric positioned within the tire carcass body so that the individual cords of one ply piece traverses the tire carcass from one bead to extend across the tire centerline at one commercially uniform bias angle and the individual cords of the second ply piece traverse the tire carcass a similar distance from the opposite bead which cords are angularly positioned at a like but opposite bias angle to the first cords to form a V-pattern where the individual cords meet and may overlap and extend beyond the tire centerline more than a marginal distance. These body and sidewall ply cords are at low rigidity bias angle ranges (2° to 29° to a radial line of the tire at the tire centerline) when compared to higher rigidity bias angles used in belt ply designs and may extend to the opposite tread shoulder area.

Specifically, the present invention relates only to circumferential (or directional) strength imbalance in belt ply cord designs positioned in the tire crown area wherein the two relatively narrow confluent ply pieces are not secured to a tire bead; they lie underneath respective tread shoulder areas of the tire and overlap the carcass centerline but do not extend to the opposite tread shoulder area, and wherein at least two confluent ply pieces overlap the circumferential centerline of the tire carcass significantly more than a marginal distance.

The confluent ply pieces are of known belt cord materials and positioned at high rigidity bias angles but unlike non-directional prior art ply belt design patterns because the confluent belt plies that rotate in a forward wheel direction possess greater cord reinforcement strength than the confluent belt plies that rotate in reverse wheel rotation. Therefore, the invention provides and teaches structural belt ply design to imbalance the circunmferential reinforcement strength of belt ply cord material with respect to direction of tire rotation, i.e. forward to reverse vehicle travel.

DISCLOSURE OF THE INVENTION

Objects of the invention are to provide novel "directionally mounted" tires and improved pneumatic tire designs and having a directionally strengthened tire "belt ply cord construction" wherein the tire body ply carcass can be a confluent ply, radial or bias tire type including a directional or non-directional rotational *body ply* carcass design; the tire crown area can have a lateral controlled rigidity wherein it must be combined and be compatible with rotary or circumferential belt cord strength imbalance when applied on the body cord plies forming the tire body carcass.

Another object of the directional tire of the invention is to provide a high rigidity belt ply design that will provide required impact resistance and meet U.S. Department of Transportation requirements in the cured tire crown area via a significant overlap of confluent ply cord at the carcass centerline.

Yet another object of the invention is to provide a directionally mounted tire having reduced impact shock, improved ride, lower operating temperature and more uniform tread wear between tread center and shoulder areas by providing forward and reverse circumferentially controlled strength and rigidity to reduce physical hysteresis in the tire crown area.

The foregoing and other objects and advantages of the directional tire belt invention will be made more apparent as the specification proceeds, and the novel directionally mounted pneumatic tire designs comprise a tire crown area and a cord body carcass, the tire crown area above the carcass including at least one two-piece confluent belt ply having cords of each ply piece positioned at commercially equal high rigidity bias angles with cords extending at opposite bias angles from an area under respective tread shoulders to terminate significantly short of the area under the opposite tread shoulders and wherein at least two confluent ply pieces overlap the circumferential centerline of the tire carcass more than a marginal dimension.

BRIEF DESCRIPTION OF THE DRAWINGS

Reference is particularly directed to the accompanied drawings, wherein:

FIG. 1 is a diagrammatic portrayal of a tire embodying the confluent four piece, directional belt ply design characteristics of the invention and will be a directional tire because the confluent belt ply cords that are positioned in opposite rotary directions of the tire will have different physical properties and/or different cord count per inch.

FIG. 2 is a diagrammatic portrayal of a second directional belt ply design embodying the principles of the directional confluent six piece belt ply design of the invention and wherein the tire has two confluent plies positioned in one specified circumferential direction of tire rotation and one confluent ply positioned in the opposite circumferential rotary direction of tire rotation therein and the tire being a directional design as indicated by arrow 42.

FIG. 3 is a section view of the tire of FIG. 1; FIGS. 3a;, 3b, 3c; and 3d comprise diagrammatic showings of yet other embodiments of the principles of the present invention and showing typical positions and lengths of tire cords used in making tires comprised of typical confluent ply belts of the present invention; and FIG. 4 is a diagrammatic portrayal of another directional tire belt design forming another embodiment of the principles of the invention which combines two narrow confluent ply cord pieces with two wide standard or conventional ply cord pieces to provide a belt ply assembly for a "directional" tires as indicated by the forward rotational arrow 92.

When referring to corresponding members shown in the drawings and referred to in the specification, corresponding numerals are used to facilitate comparison therebetween.

BEST MODE FOR CARRYING OUT THE INVENTION

A pneumatic tire embodying the principles of the invention is indicated as a whole by the numeral 10 in FIG. 1 of the drawings. The tire 10 has a tread 12 of any desired design provided thereon and this tire 10 has shoulder areas or shoulders 14 and 16 provided thereon. Such tire 10 of course has a suitable tire carcass 11 provided therein without the usual body ply cords being illustrated and being completed with a pair of two-piece confluent ply belts of any type cord material. Thus, FIG. 1 shows that a pair of ply pieces 24 and 22 are applied on the tire body and form one confluent belt ply of the tire carcass with the cords therein being of high bias angles and each respective ply piece positioned to extend in from under opposite tread shoulder areas to and significantly more than a marginal dimension beyond the tire centerline in opposite directions so as to form a V-shape or one confluent ply pattern comprised of the two narrow ply pieces. A second pair of these relatively narrow high bias angle confluent ply pieces is applied with confluent ply cord bias angles in the opposite rotary direction of the tire and are shown at 18 and 20 in the drawings. One marginal edge of each of these ply pieces is positioned under one of the tread shoulder areas 14 and 16 and the cords extend toward the other shoulder area but terminate significantly short thereof, and wherein they also overlap the centerline significantly more than a marginal dimension. The ply pieces are of the belt type ply cord materials and are narrow compared to conventional or standard full width ply cord pieces. This is well indicated in FIG. 1. Hence, the ply 24 starts under the area of tread shoulder 16 but terminates significantly short of the opposite tread shoulder 14 whereas the opposite ply 22 of this pair of ply pieces extends from under the tread shoulder 14 but terminates significantly short of tread shoulder 16. Likewise, the ply piece 18 extends from under the tread shoulder 14 only and terminates significantly short of tread shoulder 16 and the opposite or companion ply piece 20 extends under only the opposite tread shoulder 16 and terminates significantly short of tread shoulder 14. The inner ply step off, or ends of the confluent ply pieces may and are preferably offset from each other to avoid tread cracking in tread design areas. This can be seen from FIG. 1 in that the plies 24, 20, 18 and 22 have the inner cord ply edges that terminate at marginally different lateral locations in the tire crown area and thereby provide stepped ply edges in this tire's belt ply design.

The directional pneumatic tires of the invention utilize a variety of "directionally" strengthened tire ply belt constructions that can be provided by using a plurality of confluent plies wherein an even number of confluent plies have different physical strength characteristics, by utilizing different counts per inch, and/or wherein an uneven number of confluent plies are present in one or opposite rotary directions of the tire and wherein all ply cords may have like physical strength characteristics.

It will be realized that at least one of the two-piece confluent ply cord layers must always overlap at the mid-circumferential centerline in the tire carcass crown area significantly more than a marginal amount to meet U.S. Department of Transportation tire plunger tests and/or tire strength requirements in the crown area of operational tires.

This new directionally strengthened tire belt ply construction teaches the means and designs to vary the ratio of tire cord strength and rigidity in the tires forward to reverse direction of tire travel and a new means to improve tire durability, service life and eliminate the cost of excess belt cord reinforcement.

VIZ., the tire of the invention has optimum directionally imbalanced tire belt ply cord strength and rigidity to resist torsional stress force in forward tire rotation and reduce the physical hysteresis effect in the tire crown area, to provide uniform tread wear across the tread surface area and improve tire mileage. Because of the presence of directional or circumferentially imbalanced rigidity in the tire crown area, the tire after being flattened during the load deflection portion of its rotation will reduce hysteresis reaction by quickly recovering its cross section profile via internal tire pressure with less heat buildup in the entire tread area. Another object of the invention is to provide new directionally strengthened belt plies which may also be used in novel tire retread belt ply designs.

In the tire 10a of FIG. 2, three pairs of the confluent ply pieces are provided and wherein confluent ply pieces 30 and 32; .34 and 36; and 38 and 40 are present in the tire and wherein confluent ply pieces 30 and 32 overlap and 38 and 40 overlap respectively at opposite and commercially equal high bias angles and extend in one rotary direction of the tire carcass whereas the confluent ply pieces 34 and 36 overlap at opposite bias angles and extend in opposite rotary direction of the tire carcass. The cords of each confluent ply piece in the above confluent ply are thus positioned at opposite bias angles to form a confluent ply pattern. The lateral inner margins of the ply pieces are stepped off in the tire as is generally preferred but they need not be. The tire belt ply assembly is directional and the completed tire must be mounted to rotate the belt ply assembly in the forward direction indicated by the arrow 42.

FIG. 3 is a diagrammatic section view of the "belt ply" design shown in FIG. 1, but with the suffix "b" added to the numbers identifying the similar components.

In FIG. 3a, a diagrammatic showing is made of confluent plies wherein the "belt ply" design is the type as shown in FIG. 2 of the drawings and where the ply pieces 38a and 40a would form one confluent belt ply, the ply pieces 30a and 32a form a second confluent belt ply, and the ply pieces 34a and 36a would form a third confluent belt ply in the tire having a carcass 10a. The confluent belt plies of the invention, of course, are never secured to either of the tire beads of the tire carcass. The cords in each of the three confluent belt plies are positioned at opposite and intersecting bias angles at the tire centerline and the tire formed is a "directional" type because the cords in two confluent belt plies extend from the tire tread shoulder area in the one rotary direction of the tire and only one confluent belt ply extends in opposite rotary direction of the tire.

Note that a directional tire indicated diagrammatically in FIG. 3b may include a plurality of standard or conventional wide ply pieces 62 and 64 therein which ply pieces would be centered in the tire and there would just be a one two-piece confluent ply made from ply pieces 66 and 68 positioned on the tire body carcass.

Yet a further modified directional tire belt design shown in FIG. 3c wherein the ply pieces 70 and 72 would form one confluent ply and an additional confluent ply would be formed from the narrow ply pieces 74 and 76 and the inner edges all having a stepped lateral marginal relationship with each other. FIG. 3d shows a very simple type of a directional ply belt design wherein only one confluent belt ply is used in the tire carcass and wherein this one confluent belt ply is formed from ply pieces 78 and 80 each respective ply piece being positioned under one tread shoulder and extending significantly short of the opposite shoulder of the tire as indicated and overlaping each other significantly more than a marginal dimension at the tire centerline.

A plurality of standard or conventional ply cord pieces may be added to the directional belts of FIGS. 3c and 3d to provide heavy duty circumferentially strengthened tire belt ply assemblies.

In FIG. 4, yet a further embodiment of the directional pneumatic tire 10g of the invention is shown and this tire includes a tire carcass 11g; a combination belt design of FIG. 3b wherein the ply cord step off at the outer edge of the belt ply assembly is reversed. In this embodiment of the invention, the tire belt assembly is directionally rotated forward as indicated by arrow 92 and it includes standard or conventional ply cord pieces 82 and 84 positioned at opposite high rigidity bias angles and wherein each wide ply piece extends from substantially under one shoulder area 83 of the tire to the opposite shoulder area 85 of the tire. These wide ply pieces 82 and 84 are non-directional with respect to circumferential cord reinforcement strength because they both provide non-directional cord reinforcement across the entire crown area of the tire equally in both forward and reverse rotary or circumferential directions. This tire belt ply assembly is directional because it also comprises one confluent ply made from two relatively narrow ply pieces 86 and 88 wherein each ply piece extends from under opposite tread shoulders to pass the centerline more than a marginal distance and terminates a significant distance from the tires tread shoulder area. Therefore the confluent ply pieces 86 and 88 will reinforce both tread shoulder areas in only one single or forward rotary direction of this tire making it a directional type pneumatic tire.

This tire 10g is designed to have added strength re the plunger test on the tire periphery and a directional control of rigidity is provided in the tire crown area depending upon the physical strength characteristics of the cord in the confluent ply being used.

The tire body ply cord design used in tires of the invention can e of any known body ply construction, i.e. radial ply, bias ply and the confluent ply type cord construction disclosed in U.S. Pat. No. 4,,360,051. The high rigidity belts, as previously indicated, have cords that intersect a radial line in the tire at higher angles than the body plies in the tire carcasses and such belt cord angles would intersect at the tire centerline above 50° to a radial line of the tire. The term "high rigidity belt ply" is used in this patent application to indicate the presence of belt ply cord material positioned under the tread area of the tire at higher bias angles to a radial line of the tire than those present in the body ply cord structure. These strength imbalanced confluent belt ply cord assemblies of the invention are therefore in geometric position to provide the desired forward to reverse belt strength imbalance and thus control rigidity imbalance in forward to reverse ratios that are relative to the service requirement of the operational tire by:

(a) increasing resistance to torsional or circumferential stress force thus eliminating hysteresis type tire profile or shape changes in the crown and tire tread profile when the vehicle is operational.

(b) increasing tire resistance to external impact force in the tire's tread area, such as road surface irregularities when the vehicle is operational in a forward direction.

(c) reducing tire temperature buildup and maintaining the tires cured dimensions to prevent tread cracking and uneven wear.

From the foregoing, it is submitted that the objects of the invention have been achieved by the provision of the new pneumatic tire of the present invention wherein the rigidity and strength of the tire and its tire carcasses via circumferentially imbalanced belt cord reinforcement strength can be directionally (circumferential of the tire) controlled by utilizing directionally strengthened high rigidity confluent type ply cord positioning in the crown area of the tire.

The following definitions are respectfully submitted to clarify the specific meaning of the term comfluent belt ply.

VIZ: The standard nomenclature used in the art of tire technology, identifies a tire belt ply or cord breaker ply as a single piece of calendered cord fabric positioned on the tire's carcass so that the individual cords traverse the entire tire carcass crown from one tread shoulder to the opposite tread shoulder area.

A confluent belt ply as the term is used in present belt ply invention and description of the claims, is structurally different than the standard tire's tire belt ply. This term identifies a tire belt ply or cord breaker ply as two relatively narrower pieces of calendered cord fabric positioned within the tire's carcass so that the individual cords of one said ply pieces traverse the tire carcass crown from one tread shoulder area and the individual cords of the second said ply piece traverse the tire carcass from the opposite tread shoulder area and the cords of said belt ply pieces are angularly positioned at commercially uniform bias angles to form a chevron or "V" pattern as they traverse the carcass center where they meet and/or overlap more than a marginal distance as desired but do not extend to the tire's tread shoulder areas.

While several complete embodiments of the invention have been disclosed herein, it will be appreciated that modification of these particular embodiments of the invention may be resorted to without departing from the scope of the invention.

What is claimed is:

1. A directional type pneumatic tire having only one 2 piece high rigidity belt ply assembly wherein the cord reinforcement strength is imbalanced in a specified circumferential direction of tire rotation and wherein the cord reinforcement strength is balanced in true axial or lateral direction of the tire carcass, comprising:
 a tire cord body carcass having a crown area and having beads therein, and a tire tread on the tire carcass, and wherein said tire body carcass includes only one directionally strengthened two-piece high rigidity confluent cord belt ply assembly made of two relatively narrow cord ply pieces having cords of each respective ply piece positioned at high bias angles above 50° to a radial line of the tires at the tire centerline and with cords of each respective ply piece all being inclined at equal and opposing high bias angles in one specified rotary direction of the tire and extending from under one respective tread shoulder and terminating short of the other respective tread shoulder and none of said ply pieces being axially discontinuous or extending into either respective tire side wall, and
 wherein the two confluent ply cord pieces overlap at the centerline an appreciable distance and terminate short of their opposite respective tread shoulder to significantly strengthen the center area of the tire, said 2 piece confluent belt ply assembly cord reinforcement strength being structurally strengthened in a specified circumferential direction of tire rotation and wherein the structural cord reinforcement strength is balanced in the axial or lateral direction of the tire carcass.

2. A directional type pneumatic tire having high rigidity belt plies wherein the cord reinforcement strength is imbalanced in a specified direction of tire rotation comprising:
 a tire cord body carcass having a crown area and having beads therein, and a tire tread on the tire carcass, and wherein said tire body carcass includes directional two-piece high rigidity confluent cord belt ply assemblies made of two relatively narrow cord ply pieces having cords of each ply piece positioned at high bias angles above 50° to a radial line of the tire at the tire centerline and with cords of each ply piece all being inclined at equal and opposing bias angles in one specified rotary direction of the tire and extending from an area under one tread shoulder and terminating short of the area under the other tread shoulder, wherein the two confluent ply cord pieces overlap at the tire centerline an appreciable distance to significantly strengthen the center area of the tires, and wherein an even number of high rigidity confluent belt plies are present and an equal number being inclined in opposite rotary direction of the tire and wherein the cords per inch of ply cord width, and/or the cord strength or physical properties of the cords is significantly different in the confluent plies which are inclined in one rotary direction than those in the confluent plies which are inclined in the opposite rotary direction of the tire to provide ply strength imbalance in rotary or circumferential direction of tire rotation.

3. A directional type pneumatic tire having high rigidity belt plies wherein the cord reinforcement strength is imbalanced in a specified direction of tire rotation comprising:
 a tire cord body carcass having a crown area and having beads therein, and a tire tread on the tire carcass, and wherein said tire body carcass includes directional two-piece high rigidity confluent cord belt ply assemblies made of two relatively narrow cord ply pieces having cords of each ply piece positioned at high bias angles above 50° to a radial line of the tire at the tire centerline and with cords of each ply piece all being inclined at equal and opposing bias angles in one specified rotary direction of the tire and extending from an area under one tread shoulder and terminating short of the area under the other tread shoulder, wherein the two confluent ply cord pieces overlap at the tire centerline an appreciable distance to significantly strength the center area of the tires, and
 wherein an uneven number of high rigidity confluent plies of the invention are present and the majority number of confluent plies are inclined in one specified rotary direction of the tire to provide greater circumferential cord reinforcement strength and/or resistance to torsional stress in the specified direction of wheel rotation.

4. A directional type pneumatic tire as in claim 3, wherein the cords per inch of ply width, and/or the cord strength or physical properties is different in the confluent plies which are inclined in one rotary direction than those which are inclined in the opposite rotary direction of the tire.

5. A directional type pneumatic tire as in claim 3 wherein the cords per inch of ply cord width, and/or the cord strength or physical properties of the cords is significantly different in the confluent plies which are inclined in one rotary direction than those inclined in the opposite rotary direction of the tire carcass.

6. A directional type pneumatic tire having only one 2-piece, high rigidity confluent belt ply assembly wherein cord reinforcement strength is imbalanced in a specified direction of tire rotation and wherein cord reinforcement strength is balanced in the axial or lateral direction of the tire carcass and one wide 2-piece, high rigidity belt ply assembly is present wherein the cord reinforcement strength is circumferentially structurally balanced in either direction of tire rotation and wherein the cord reinforcement strength is balanced in the axial or lateral direction of the tire carcass comprising:

a tire cord carcass having beads, a crown area and a tire tread which has two tread shoulders and wherein one said 2-piece conventional belt ply assembly is non-directionally structurally cord reinforcement strengthened in both axial and circumferential directions of the tire carcass and a second ply cord assembly is present comprised of one 2-piece confluent ply cord assembly that is axially strength balanced but is also structurally strength imbalanced in a circumferentially specified direction of tire rotation and said 2-piece confluent ply assembly having one directionally strengthening cord reinforcement ply in the areas under each of the tire's tread shoulders in a circumferential tire direction and said confluent belt ply assembly includes two narrow confluent belt ply pieces, none of said belt ply pieces being axially discontinuous, the cord edges of the respective confluent belt ply pieces extending from under a tread shoulder to overlap at the tire centerline an appreciable distance and terminating short of each opposite respective tread shoulder, the cords of each confluent ply piece of said two piece confluent ply in said confluent belt ply assembly being inclined at equal and opposing bias angles above 50° to a radial line of the tire at the mid-circumferential centerline of the tire in one specified rotary direction of the tire, said cords not being anchored to a bead and not extending from the tire sidewall areas, and wherein a wide two-piece high rigidity belt ply assembly, non-directionally strengthened, in both axial and circumferential direction of the tire, is present and wherein the cords of the belt ply pieces are positioned in a manner to incline at equal and opposing bias angles above 50° to a radial line of the tire at the mid-circumferential centerline of the tire and extend continuously across the width of the tire crown, from the area under one tread shoulder to terminate at the area under the opposite tread shoulder area, none of said confluent ply pieces and none of said two belt cord ply pieces being in direct contact with said tire sidewall, and not extending into the tire sidewall area of the tire.

7. A directional pneumatic tire as in claim 6 where said cords in said belt ply pieces extend from an area under a tread shoulder and terminates appreciably short of the other shoulder area of the tire.

8. A directional pneumatic tire as in claim 6 wherein the confluent belt ply cords, extending from under one tread shoulder, overlap at the tire centerline an appreciable distance and terminate short of the other respective tread shoulder.

* * * * *